United States Patent [19]
Plumat

[11] 3,753,840
[45] Aug. 21, 1973

[54] FABRICATION OF CURVED GLASS SHEETS

[75] Inventor: Emile Plumat, Gilly, Belgium

[73] Assignee: Glaverbel, Watermael-Boitsfort, Belgium

[22] Filed: Jan. 19, 1971

[21] Appl. No.: 107,723

[30] Foreign Application Priority Data
Jan. 19, 1970 Great Britain...................... 2,445/70

[52] U.S. Cl............................. 161/1, 65/31, 65/104, 65/106, 156/6, 156/24
[51] Int. Cl............................................ C03b 23/02
[58] Field of Search....................... 65/31, 104, 102, 65/106, 114; 156/6, 24; 161/1

[56] References Cited
UNITED STATES PATENTS
3,551,228 12/1970 Meth.................................. 65/31 X
2,143,796 1/1939 Phillips.................................. 65/31

FOREIGN PATENTS OR APPLICATIONS
1,209,041 10/1970 Great Britain........................ 65/106
21,295 2/1936 Australia.............................. 65/104

Primary Examiner—Arthur D. Kellogg
Attorney—Spencer & Kaye

[57] ABSTRACT

A process for bending glass sheets to form permanently curved sheets by subjecting the sheets to a surfacing treatment which removes a layer from at least one surface of the sheet and thus removes or reduced pre-existing surface defects, the surfacing treatment at least beginning before commencement of the bending operation.

15 Claims, 2 Drawing Figures

INVENTOR
Emile Plumat

BY Spencer & Kaye

ATTORNEYS.

3,753,840

FABRICATION OF CURVED GLASS SHEETS

BACKGROUND OF THE INVENTION

This invention relates to a process for bending glass sheets.

Curved glass sheets are required for vehicle windshields and a variety of other purposes. Conventional processes for producing them involve bending the glass after heating it to a high temperature. In order that the glass can be bent to the required shape, it must generally be preliminarily heated to bring it to a viscosity having a value of below $10^{10}$ poises. When glass is heated to such a high temperature, there is considerable risk of its optical properties becoming impaired.

SUMMARY OF THE INVENTION

A primary object of the present invention is to eliminate or reduce such drawbacks.

A further object of the invention is to reduce the temperature at which glass sheets may be permanently bent.

A still further object of the invention is to render glass sheets more readily bendable by improving their surface quality.

The invention is based on applicant's discovery that a sheet of glass can be made permanently deformable under bending forces without being heated to the degree previously thought to be necessary, provided the glass is first subjected to some form of surfacing treatment. A surfacing treatment is one in which the glass surface is renewed and as a result surface defects are removed or reduced. The surface removal serves to render the elastic properties of the glass surface more uniform.

It has been found that if such a surfacing treatment is performed before the glass is subjected to bending forces, the glass can be permanently deformed while at a viscosity significantly higher than $10^{10}$ poises. For example, the glass may be permanently bent while at a viscosity of $10^{13}$ poises, corresponding to the annealing point, or at an even higher viscosity, corresponding to the strain point. It is even possible to bend a sheet of glass at a temperature below the strain point, e.g., at 460°C in the case of a sheet of glass having a strain point of 490°C.

The present invention as broadly defined thus involves a process for imparting a required permanent curvature to a sheet of glass by applying bending forces to the sheet while it is at elevated temperature, and resides in that the sheet is subjected to surfacing treatment to remove or reduce superficial surface flaws at least at a surface which is to be convexly bent and the so treated sheet is subjected to the necessary bending forces while the viscosity of the glass is about $10^{10}$ poises.

It is an important advantage of the invention that a sheet of glass can be permanently deformed at relatively low temperature to a given curvature in a period of time which is no greater than would be required if the sheet were to be bent without prior surfacing treatment and at higher temperatures in accordance with the prior art.

The surfacing treatment may be applied to both sides of the glass sheet but it is possible to perform the process in some cases with a surfacing treatment confined to that surface of the sheet which is to be convexly curved.

Advantageously the bending forces are applied while the viscosity of the glass is at least $10^{13}$ poises. The amount of heat required to reduce the viscosity of the glass to $10^{13}$ poises is appreciably less than that required to heat the glass to the temperature which must be attained if no surfacing treatment is employed, and at the lower temperature any risk of the optical properties of the glass being impaired is slight.

The surfacing treatment may, e.g., be a fire polishing or a mechanical polishing treatment. Such treatments can be easily performed and controlled.

Preferably however the surfacing treatment is performed by using an etching medium which removes a stratum of glass from the treated surface. This type of treatment can be performed rapidly and permits a high degree of uniformity in the treatment. Moreover, it improves the elastic property of the glass to a greater depth. This is probably due to the fact that the concentration of the network modifying ions present throughout the glass is not the same in the superficial zones of a piece of formed glass as in the interior thereof, and after removal of a superficial layer by the treatment such a difference in concentration no longer exists.

Preferably the temperature of the surface treatment etching medium is between 0° and 80°C. The speed of removal of material from the surface of the glass sheet can be accurately controlled by an appropriate choice of the temperature within this range. Advantageously a fluorine-containing medium is used as the etching medium. Fluorine-containing media are, generally speaking, the most effective.

It is advantageous to use an acid medium having a pH value less than four for the etching treatment. The observance of this condition is recommended where it is necessary for the treated glass to have a good transparency.

The most preferred acid media are those which consists of or at least contain hydrofluoric acid.

A very suitable etching medium is an aqueous solution of hydrofluoric acid. Another suitable medium is ammonium bifluoride. As another example, a medium may be used which comprises a fluorine-containing compound, e.g. sodium fluoride (NaF), together with sulphuric acid. A particularly effective medium is one comprising both hydrofluoric acid and sulphuric acid. For instance, a satisfactory result has been obtained in a treatment period of only a few minutes by using an aqueous solution containing approximately 6 percent by volume of each of the said acids. Of course, any etching medium concentration may be used, the particular concentration simply determining the required treatment time.

While preference is given to fluorine-containing media for effecting the surfacing treatment, the removal of a surface stratum can be achieved with other etching media. Thus, for example, a surface stratum can be removed by using a medium containing OH ions, e.g. a solution of sodium hydroxide. When using a basic medium it is preferable for the medium in contact with the glass sheet to be continuously replenished to avoid impairment of the optical properties of the glass surface.

The treatment can advantageously be applied by constantly replenishing the treatment medium in contact with the surface of the glass sheet by sprinkling or otherwise continuously supplying the sheet with the medium and allowing the medium to stream over the surface to be treated. This method has the advantage of quickly replenishing the medium as it becomes polluted by the reaction with the surface of the sheet. The treatment can also be performed in this way when using a fluorinated compound in the form of a gas or a vapor.

An alternative way of performing the process is to dip the glass sheet in a bath of the treatment medium. Reaction products are effectively removed from the surface being treated also when proceeding in that way.

Further surfacing treatment of the glass can be carried out during bending if so required. Such further treatment can be a continuation of the surfacing treatment performed prior to bending.

Advantageously, the treatment medium and the glass sheet are given a relatively oscillatory movement at sonic or ultrasonic frequency. It has been found that this movement accelerates the beneficial action of the treatment medium.

In a particlar embodiment, by surface treating a sheet of soda-lime glass, the tensile strength of the sheet was increased from 7 kg/mm2 to 140 kg/mm2. This was the case for a surface treatment of a sheet of window glass, carried out by means of an aqueous solution containing 6 percent by volume of hydrofluoric acid and 6 percent by volume of sulphuric acid, the solution having a temperature of 20°C, and the treatment lasting for a time of 60 minutes.

When by a treatment according to the invention, one removes a stratum of glass from the surface, the thickness of such stratum is preferably equal to or greater than the depth of the surface flaws of the glass sheet. However good results can also been obtained by removing the stratum having a thickness less than that.

The higher the temperature to which the glass is heated, the more quickly can it be permanently bent. When bending a sheet of glass having an annealing point of 540°C, we prefer to heat the glass to 540°C preparatory to bending it. Under these conditions, a flat windshield blank for a road vehicle can be bent in a period of ten minutes to the curvature required. It is of course possible to bend the glass at a lower temperature, for example 460°C. At that lower temperature, however, the glass must be bent more slowly and for bending the glass to the same extent a period of about 30 hours or more is required.

The bending forces can be applied to the glass sheet, for example by pressing the sheet between shaping molds or by subjecting the periphery of the sheet to pressure while the sheet is supported on a shaped former. In designing the mold components or other formers, a correctional coefficient should preferably be applied to allow for residual elasticity of the glass and to avoid unduly long treatments. The effect of residual elasticity varies in dependence on temperature. If no correction factor is introduced, the sheet must be held flexed at the chosen bending temperature for an appreciably longer time.

The fact that the bending of the glass can occur at temperature below the annealing range of the glass is of importance for the design of the shaping tools. The tools used for supporting bent glass sheets during thermal tempering in the conventional process of bending and tempering sheets of glass are expensive; they have to withstand the high temperatures to which the glass is raised in thermal tempering and to possess high mechanical strength at those temperatures. Moreover, there are considerable problems due to the tendency of the glass at those very high temperatures to adhere to the formers. Attempts have been made to interpose materials between the glass and the formers in order to reduce adherence and impressions on the glass as far as possible, but these steps have not proved to be adequate.

Formers for use in a process according to the invention can be made from a variety of materials. In general, they have only to withstand temperatures of 560°C at the most. Various steels can be used. A good example is an austenitic 18/8 (18 percent by weight chromium; 8 percent by weight nickel) steel with a low carbon content, for instance 0.02 percent. A wide range of suitable materials is available, however. Since the effects of scaling by oxidation are considerably reduced, contact with the glass is also improved. At the lower temperatures, adhesion is not such a problem, and the interposition of special material between the glass and the former can usually be dispensed with. The invention can be applied for bending part of a continuously formed ribbon of glass and the term "sheet" as used herein is to be construed broadly to include such a ribbon part unless the context requires otherwise.

The invention is primarily but not exclusively concerned with the bending of drawn sheet glass of ordinary composition, e.g. ordinary soda-lime glass. The transformation range of such glasses corresponds approximately to the temperature range 600°–400°C. However, any type of glass can be treated according to the invention.

By means of the invention it is possible to bend very thin sheets, e.g. sheets of the order of 1 mm in thickness, as well as thicker sheets, e.g., sheets up to 10 mm in thickness.

DESCRIPTION OF THE PREFERRED EMBODIMENTS

Figure 1:
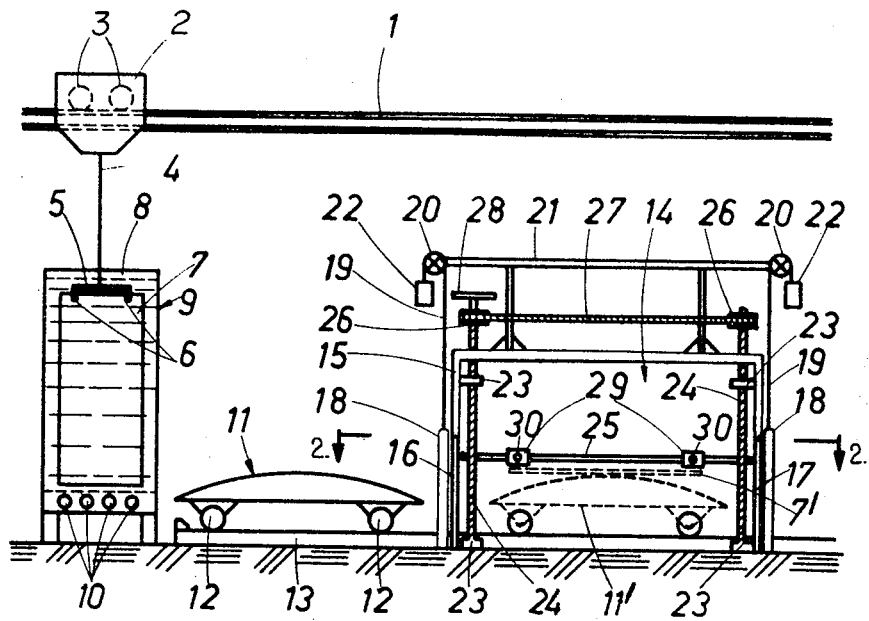
FIG. 1 is a cross-sectional elevation of one embodiment of apparatus for carrying out the process of the invention.
Figure 2:
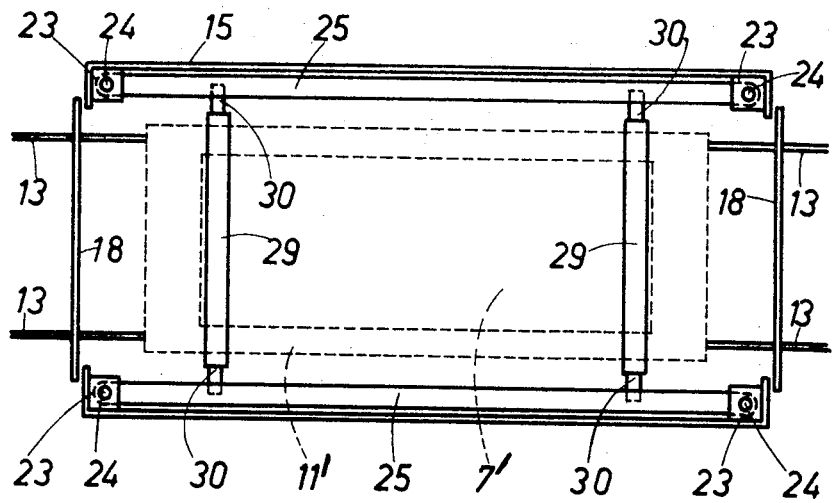
FIG. 2 is a cross-sectional plan view along line 2—2 of FIG. 1.

The illustrated installation includes track 1 along which a crane trolley 2 runs by means of rollers 3. A cable 4 associated with the trolley carries a rocking lever 5 having tongs 6 for supporting a sheet of glass 7 in a bath 8 of etching medium, for instance a solution of hydrofluoric acid contained in a tank 9 and maintained at the treatment temperature by means of heat exchangers 10.

After a suitable immersion period, the sheet 7 is removed from the bath and laid flat on a die 11 having wheels 12 which run on rails 13. This die, with a surfaced glass sheet thereon, can be pushed into a furnace 14, in which the mold and glass sheet are shown in broken lines and designated 11' and 7'.

The furnace 14 comprises an enclosure 15 with an inlet aperture 16 and an outlet aperture 17. Each of the apertures 16 and 17 can be closed by a drop gate 18 suspended from a cable 19 which runs over a pulley 20 borne by a frame 21 and has a counterweight 22 attached to its other end. Bearings 23, disposed near the four upper and lower corners of the furnace support four vertical screw-threaded rods 24. The two vertical rods, which in the view of FIG. 1 are on the far side of the furnace, are in screw-threaded engagement with a horizontal bar 25 and the other two vertical rods are in screw-threaded engagement with another horizontal bar identical with bar 25. The horizontal bars 25 are in the form of square section tubes and can be raised or lowered by rotating the rods 24 in one direction or the other. The rods are connected by a roller chain 27 which passes around pinions 26 on the rods and the system is actuated by a flywheel 28.

The furnace is heated by electrical resistors (not shown). Any other type of heater could be used.

Transverse pressing elements 29 are rockably supported by end trunnions 30 between the bars 25. The trunnions are received in apertures in the bars 25. A series of such apertures is preferably provided to permit the positions of the pressing elements to be varied to suit glass sheets of different sizes. When a glass sheet on the die 11 has been brought into the furnace and has been brought to a suitable temperature, the bars 25 are lowered to bring the pressing elements 29 into contact with the end margins of the sheet. Then the bars 25 are further lowered gradually over a predetermined period of time so that the pressing elements press down on the ends of the sheet and progressively bend the sheet to the curvature of the die. The length of time taken for this bending operation depends inter alia on the temperature of the glass sheet. Afterwards, the bars 25 and the pressing elements are raised, the drop gates 18 are raised, and the die with the bent glass sheet thereon is advanced out of the furnace.

After bending a sheet of glass in accordance with the invention, the sheet can be tempered thermally or chemically over the whole or only a part of its area.

Preferably the bent sheet is chemically tempered. Any type of chemical tempering method may be adopted. Chemical tempering involves the diffusion of ions into surface layers of the glass from a contacting medium. Usually such diffusion is part of an ion exchange process between the glass and the medium but the diffusion may occur during the influence of a direct or alternating electric current field with or without accompanying displacement of ions from the surface layers of the glass into the contacting treatment medium, depending on whether an alternating or direct current electric field is employed.

According to one type of chemical tempering treatment involving an ion exchange, compressive stresses are set up in surface layers of the glass by replacing ions in such layers by ions which confer a lower coefficient of thermal expansion on such layers, at a temperature which is sufficiently high and which is maintained for a time sufficiently long for stress relaxation to occur, and subsequently allowing the glass to cool. According to an alternative type of chemical tempering treatment, surface compressive stresses are set up in surface layers of the glass by replacing ions in such layers by larger ions while the surface layers are at an elevated temperature which, however, is too low to allow substantial, or at least not a complete, stress relaxation, in the length of time for which such temperature is maintained, the glass being then cooled to normal temperature so that the induced stresses are "frozen in."

Preferably the bent sheet is chemically tempered by a method involving the exchange of alkali metal ions between surface layers of the glass and a contacting treatment medium. It is presently preferred for this ion exchange to be an exchange whereby alkali metal ions in the glass are replaced by larger ions at a temperature below the annealing range. In particular, preference is given to processes in which sodium ions in surface layers of the glass are replaced by potassium ions at a temperature below the annealing range. By keeping the temperature below the annealing range, little or no risk is incurred of impairing the optical properties of the glass.

The chemical tempering treatment may follow immediately on completion of the bending of the sheet to its required curvature. The sheet need not be cooled between the bending and tempering stages, with the result that there is a substantial energy saving.

The chemical tempering treatment may alternatively be commenced before completion of the bending of the sheet to its required curvature. Thus, for example, the bending forces required for completing the bending of a sheet of glass may be applied while the sheet is exposed in a vessel or chamber to a chemical tempering medium. Such medium may be, for example, a molten salt such as molten potassium nitrate and the glass sheet may be immersed in such salt.

The following are specific examples of processes according to the invention.

EXAMPLE 1

A sheet of glass measuring 1m × 1m × 0.004m and having the following composition in percentages by weight:

| | |
|---|---|
| $SiO_2$ | 72% |
| $Na_2O$ | 14.2% |
| CaO | 8.1% |
| MgO | 4.5% |
| $Fe_2O_3$ | traces |
| $Al_2O_3$ | 1.2% | was immersed for 25 minutes in an aqueous solution containing 6 percent by volume of sulphuric acid and 5 percent by volume of hydrofluoric acid, such solution having a temperature of 20°C. After withdrawal of the sheet from the solution, it was heated to 540°C (corresponding to a viscosity of $10^{13.2}$ poises) and bent within a few seconds at that temperature to a radius of curvature of 28 cm. The sheet was held at that curvature for ten minutes and was then released to allow it to take up its natural permanent curvature which had a radius of 35 cm. This particular glass had an annealing point of 540°C and a strain point of 490°C.

A sheet of glass of the size and composition used in the foregoing example could be bent to a permanent curvature of 35 cm radius without first subjecting it to the described surfacing treatment, by heating the glass sufficiently to reduce its viscosity to a value of the order of $10^8$ poises and then allowing the sheet, while maintaining it at that temperature, to bend under its own weight and thereby conform to the surface of a supporting form. However, the time required for that operation and subsequent cooling of the sheet would be about two hours.

It would also be possible to bend a sheet of glass of the said size and composition at a temperature of 540°C without first subjecting the sheet to the described surfacing treatment but in that case the sheet could not be bent in a time period of ten minutes to a permanent curvature of less than 3.5 meters radius. Without the surfacing treatment it would take very much more than two hours to bend the sheet to a permanent curvature of 35 cm radius.

EXAMPLE 2

A sheet of glass of the size and composition used in Example 1 was subjected to a surfacing treatment wherein an aqueous solution of NaOH (concentration 20% by weight) at 30°C was caused to stream continuously over a surface of the sheet for a period of four hours.

The sheet was then heated to 525°C and bent at that temperature within a few seconds, causing its treated surface to be convexly curved, to a curvature of 35 cm. The sheet was held at that curvature for 30 minutes. The permanent curvature imparted by this operation was 45 cm in radius.

EXAMPLE 3

A sheet of glass of the same composition as that used in Example 1 and measuring 1m × 1m × 0.007m was immersed in a bath composed of molten $PbF_2$ and PbO (weight ratio 47:53) at 507°C. After a few minutes the sheet was bent, while still in the bath, to a radius of curvature of 49 cm. The bending took place within a few seconds and the sheet was held at that curvature for 30 minutes. The sheet was then withdrawn from the bath and subjected to further bending forces whereby the radius of curvature of the sheet was reduced within five minutes to 34 cm and the sheet was held at that curvature for one hour. The permanent curvature obtained by this treatment was 38 cm in radius.

EXAMPLE 4

A sheet of glass of the same composition as that used in Example 1 and measuring 0.3m × 0.3m × 0.004m was fire-polished by preheating the sheet to 450°C and then exposing one surface of the sheet to a flame whereby such surface became heated to 660°C. The sheet was then cooled in a furnace at 450°C and was subsequently bent, while at 525°C and within a period of five minutes, to a radius of curvature of 28 cm. The sheet was held at that curvature for 30 minutes. The permanent curvature thus imparted to the sheet was 36 cm in radius.

EXAMPLE 5

A sheet of glass identical in composition to that used in Example 1 and measuring 0.02m × 0.50m × 0.001m was immersed for 65 minutes in an aqueous solution identical with that used in Example 1 at a temperature of 20°C.

After withdrawal of the sheet from the solution, it was heated to 490°C and was then bent within a few seconds to a radius of curvature of 10 cm. The sheet was held at that curvature for 60 minutes. The permanent curvature thus imparted to the sheet was 22 cm in radius.

EXAMPLE 6

A sheet of glass identical with that used in Example 1 was immersed for 55 minutes in a solution of the same composition, and at the same temperature, as that used in Example 1. After withdrawal of the sheet from the solution it was heated to 490°C and bent at that temperature within a period of one minute to a radius of curvature of 35 cm and was held at that curvature for 45 minutes. The permanent curvature thus imparted to the sheet was 100 cm in radius. The sheet was then subjected to further bending forces to bring it in a period of ten minutes to a radius of curvature of 26 cm and was held at that curvature for 120 minutes. The permanent curvature thus imparted to the sheet was 33 cm in radius.

EXAMPLE 7

A sheet of glass measuring 1.5m × 0.2m × 0.003m having the following composition in percentages by weight:

| | |
|---|---|
| $SiO_2$ | 70% |
| $Na_2O$ | 12% |
| CaO | 10% |
| MgO | 3% |
| $Fe_2O_3$ | traces |
| $Al_2O_3$ | 5% | was immersed for 7 minutes in an aqueous solution containing 6 percent by volume of sulphuric acid and 5 percent by volume of hydrofluoric acid, the solution being at a temperature of 30°C.

After withdrawal of the sheet from the solution, it was heated to 525°C and bent within a few seconds to a radius of curvature of 22.5 cm. The sheet was held at that curvature for 30 minutes. The permanent curvature thus imparted to the sheet was 44 cm in radius. This particular glass has a viscosity of $10^{15}$ poises at 510°C, $10^{13}$ poises at 540°C and $10^{10}$ poises at 620°C.

EXAMPLE 8

A sheet of glass measuring 0.5m × 0.5m × 0.004m having the following composition in percentages by weight:

| | |
|---|---|
| $SiO_2$ | 69% |
| $Na_2O$ | 12% |
| CaO | 10% |
| MgO | 3% |
| $Fe_2O_3$ | traces |
| $Al_2O_3$ | 6% | was immersed for 15 minutes in an aqueous solution containing 10 percent by volume of hydrofluoric acid, the solution being at 20°C. After withdrawal of the sheet from the solution, it was heated to 527°C and bent within a period of one minute to a radius of curvature of 30 cm and was held at that curvature for 45 minutes. The permanent curvature thus imparted to the sheet was 43 cm in radius. The viscosity of this particular glass is $10^{15}$ poises at 512°C, $10^{13}$ poises at 543°C and $10^{10}$ poises at 624°C.

EXAMPLE 9

A sheet of glass measuring 1m × 0.25m × 0.004m having the following composition in percentages by weight:

| | |
|---|---|
| $SiO_2$ | 60% |
| $Na_2O$ | 12% |
| CaO | 10% |
| MgO | 6% |
| $Fe_2O_3$ | 1% |
| $Al_2O_3$ | 5% |
| $B_2O_3$ | 6% | was immersed for 17 minutes in an aqueous solution containing 10 percent by volume of hydrofluoric acid, the temperature of the solution being 20°C. After withdrawal of the sheet from the solution it was heated to 480°C and bent at that temperature within a period of five minutes to a radius of curvature of 30 cm. The sheet was held at that curvature for 60 minutes. The resulting permanent curvature imparted to the sheet was 66 cm. This particular glass has a viscosity of $10^{15}$ poises at 450°C, $10^{13}$ poises at 535°C and $10^{10}$ poises at 600°C.

EXAMPLE 10

A sheet of glass of the same composition as that used in Example 1 and measuring 1.50m × 0.65m × 0.003m was surface treated in an aqueous solution containing 7 percent by volume of hydrofluoric acid and 7 percent by volume of sulphuric acid preparatory to bending the glass sheet in a plane containing the longitudinal axis of the sheet to impart to it a curvature varying along the length of the sheet, the curvature being slight at a central zone measuring 80 cm in the longitudinal direction of the sheet but very marked at the end portions abreast of that central zone. It was not necessary to subject the central zone to a surfacing treatment preparatory to the bending operation and the sheet was covered in that zone with a thick layer of paraffin to protect it from the acid solution. The sheet was then immersed in the acid solution for 90 minutes, the temperature of the solution being 23°C. After withdrawal of the sheet from the solution, the paraffin coating on the central zone was removed. The sheet was then heated to 460°C, corresponding to a glass viscosity of $10^{15.8}$ poises, and placed on a form of appropriate shape. The end portions of the sheet, which projected 35 cm beyond the ends of the form, were then forced downwardly to bring these end portions within a period of three minutes to a curvature of 30 cm radius. The sheet was held at that curvature for 24 hours. The resulting permanent curvature imparted to the end portions was 44 cm in radius.

The curved sheet was then immersed for a period of two hours in a bath of molten potassium nitrate at 460°C. During this immersion sodium ions initially present in surface layers of the glass became replaced by potassium ions deriving from the molten medium, resulting in compressive surface stresses being built up in such surface layers.

While the above Examples have identified certain specific types of glass and surface treatments, the present invention is applicable to any type of glass and can be practiced with any type of surfacing treatment. The only criteria are that the glass be of a composition, and have dimensions, such that it is capable of being bent and that the surfacing treatment create some elimination or net reduction in the size of scratches and cracks initially present in the glass surface. Based on all tests performed to date, it appears that the time and/or temperature required for bending any glass capable of being bent will be reduced if the surface quality, or uniformity, of the glass is first improved and that any degree or type of surface quality, or uniformity, improvement will permit a corresponding reduction in the time and/or temperature required for imparting a particular curvature to the sheet.

It will be understood that the above description of the present invention is susceptible to various modifications, changes and adaptations and the same are intended to be comprehended within the meaning and range of equivalents of the appended claims.

I claim:

1. A process for imparting a selected permanent curvature to a sheet of glass, comprising the steps of removing a surface layer from at least part of a surface of the sheet which is to be convexly curved to a depth corresponding to certain surface flaws present on the sheet for at least reducing superficial surface flaws present thereon; and then applying bending forces to the sheet for bending it while maintaining it at an elevated temperature which is lower than the temperature at which it has a viscosity of $10^{10}$ poises and at least equal to a temperature at which it has a viscosity of about $10^{16}$ poises, the bending forces being applied for a time sufficient to impart the selected permanent curvature to the sheet.

2. A process as defined in claim 1 wherein said step of applying bending forces is carried out while maintaining the glass at an elevated temperature which is lower than the temperature at which it has a viscosity of $10^{13}$ poises.

3. A process for imparting a selected permanent curvature to a sheet of glass, comprising the steps of: fire-polishing at least part of a surface of the sheet which is to be convexly curved for at least reducing superficial surface flaws present thereon; and then applying bending forces to the sheet for bending it while maintaining it at an elevated temperature which is lower than the temperature at which it has a viscosity of $10^{10}$ poises and at least equal to a temperature at which it has a viscosity of about $10^{16}$ poises, the bending forces being applied for a time sufficient to impart the selected permanent curvature to the sheet.

4. A process as defined in claim 1 wherein said step of removing is carried out by applying to the surface part an etching medium which removes a stratum of glass from such surface part.

5. A process as defined in claim 4 wherein the etching medium includes a fluorine-containing ingredient.

6. A process as defined in claim 5 wherein said ingredient is hydrofluoric acid.

7. A process as defined in claim 6 wherein said medium further comprises sulphuric acid.

8. A process as defined in claim 4 wherein said medium is a liquid medium having a small pH value of less than four.

9. A process as defined in claim 4 wherein said etching medium is a liquid medium containing OH ions.

10. A process as defined in claim 9 wherein said medium is a sodium hydroxide solution.

11. A process as defined in claim 4 wherein said removing step is carried out by contacting the surface with an etching medium and continuously replenishing such medium during said treating step.

12. A process as defined in claim 4 comprising the further step of producing a relative oscillatory movement between the etching medium and the sheet during said removing step, said oscillatory movement being at at least sonic frequency.

13. A process as defined in claim 1 wherein said removing step commences before said applying step and continues during said applying step.

14. A process as defined in claim 1 comprising the subsequent step of chemically tempering said sheet after completion of said applying step.

15. A sheet of glass having a permanent curvature and produced according to the method defined in claim 1.

* * * * *